US012782738B2

(12) United States Patent
Zhao et al.

(10) Patent No.: US 12,782,738 B2
(45) Date of Patent: Nov. 3, 2026

(54) OPTICAL WAVEGUIDE STRUCTURE AND HEAD MOUNTED DISPLAY

(71) Applicant: GOERTEK OPTICAL TECHNOLOGY CO., LTD., Weifang (CN)

(72) Inventors: En Zhao, Shandong (CN); Yi Rao, Shandong (CN); Xiao Wu, Shandong (CN)

(73) Assignee: Goertek Optical Technology Co., Ltd., Weifang (CN)

( * ) Notice: Subject to any disclaimer, the term of this patent is extended or adjusted under 35 U.S.C. 154(b) by 157 days.

(21) Appl. No.: 18/864,736

(22) PCT Filed: Jun. 22, 2022

(86) PCT No.: PCT/CN2022/100326
§ 371 (c)(1),
(2) Date: Nov. 11, 2024

(87) PCT Pub. No.: WO2023/226122
PCT Pub. Date: Nov. 30, 2023

(65) Prior Publication Data
US 2025/0306375 A1 Oct. 2, 2025

(30) Foreign Application Priority Data
May 24, 2022 (CN) ......................... 202210572847.1

(51) Int. Cl.
*G02B 27/01* (2006.01)
*G02B 27/28* (2006.01)

(52) U.S. Cl.
CPC ....... *G02B 27/0172* (2013.01); *G02B 27/286* (2013.01); *G02B 2027/0109* (2013.01);
(Continued)

(58) Field of Classification Search
CPC .......................... G02B 27/286; G02B 27/0172
(Continued)

(56) References Cited

U.S. PATENT DOCUMENTS 7,583,423 B2 * 9/2009 Sutherland ............ G02F 1/1326
349/86
2017/0184848 A1 * 6/2017 Vallius ............... G02B 27/4261

FOREIGN PATENT DOCUMENTS

CN 111065951 A 4/2020

* cited by examiner

*Primary Examiner* — James R Greece
(74) *Attorney, Agent, or Firm* — Baker Botts LLP

(57) ABSTRACT

The present disclosure provides an optical waveguide structure and a head mounted display. The optical waveguide structure includes an optical waveguide body, a volume holographic element, and a liquid crystal element; the volume holographic element is provided on a first surface, and the liquid crystal element is provided on a second surface; the liquid crystal element is configured for selectively diffracting and transmitting light, the light includes a first circularly polarized light with a first polarization state which is diffracted towards the volume holographic element, the volume holographic element is configured for rotating a polarization direction of the first circularly polarized light to form a second circularly polarized light with a second polarization state which is then diffracted towards the liquid crystal element, and the second circularly polarized light is transmitted and then coupled out of the optical waveguide body.

10 Claims, 3 Drawing Sheets

(52) U.S. Cl.
CPC ................ *G02B 2027/0123* (2013.01); *G02B 2027/0174* (2013.01)

(58) Field of Classification Search
USPC .......................................................... 359/630
See application file for complete search history.

OPTICAL WAVEGUIDE STRUCTURE AND HEAD MOUNTED DISPLAY

CROSS-REFERENCE TO RELATED APPLICATIONS

The present disclosure is a National Stage of International Application No. PCT/CN2022/100326, filed on Jun. 22, 2022, which claims priority to a Chinese patent application No. 202210572847.1 filed with the CNIPA on May 24, 2022, both of which are hereby incorporated by reference in their entireties.

TECHNICAL FIELD

Embodiments of the present disclosure relate to the technical field of near-eye display imaging, and particularly to an optical waveguide structure and a head mounted display.

BACKGROUND

At present, VR (virtual reality) devices can easily achieve a large field of view of more than 90°, but they do not allow people see the external environment through the display screen, meaning they lack the ability to blend with reality. Although AR (augmented reality) devices enable users to see the external environment through the display screen and thus blend with reality, their field of view is generally smaller and rarely exceeds 60°. It can be seen that both existing VR and AR technologies have varying degrees of inadequacy in terms of user visual experience.

SUMMARY

An objective of the present disclosure is to provide new technical solutions for an optical waveguide structure and a head mounted display.

In a first aspect, the present disclosure provides an optical waveguide structure, which includes an optical waveguide body, a volume holographic element, and a liquid crystal element;

- the optical waveguide body includes a first surface and a second surface which are provided oppositely to each other, the volume holographic element is provided on the first surface, and the liquid crystal element is provided on the second surface;
- the liquid crystal element is configured for selectively diffracting and transmitting light, the light includes a first circularly polarized light with a first polarization state which is diffracted towards the volume holographic element, the volume holographic element is configured for rotating a polarization direction of the first circularly polarized light to form a second circularly polarized light with a second polarization state which is then diffracted towards the liquid crystal element, and the second circularly polarized light is coupled out of the optical waveguide body after being transmitted through the liquid crystal element.

Optionally, the first surface is provided with a second total internal reflection zone and a second diffraction zone arranged adjacently, both of which being covered by the volume holographic element; and the second surface is provided with a first total internal reflection zone and a

- first diffraction zone arranged adjacently, the first diffraction zone being covered by the liquid crystal element.

Optionally, light is reflected only once in the first diffraction zone.

Optionally, light coupled out of the liquid crystal element forms an image with a field of view greater than 80°.

Optionally, the liquid crystal element includes an alignment layer and a liquid crystal layer stacked together;

- wherein the alignment layer provides orientation states with different directions, and is configured for aligning liquid crystal molecules in the liquid crystal layer according to a preset orientation state arrangement;
- liquid crystal molecules in contact with the alignment layer in the liquid crystal layer are arranged according to the preset orientation state arrangement, and liquid crystal molecules of an upper layer are sequentially rotated to form a left-or right-handed helical structure.

Optionally, the liquid crystal element exhibits polarization state selectivity for light propagating within the optical waveguide body.

Optionally, the first circularly polarized light is left-handed circularly polarized light, and the second circularly polarized light is right-handed circularly polarized light;

Alternatively, the first circularly polarized light is right-handed circularly polarized light, and the second circularly polarized light is left-handed circularly polarized light.

Optionally, the liquid crystal element is a reflective liquid crystal grating, is a film structure, and at least partially covers an outer side of the second surface.

Optionally, the volume holographic element is a reflective volume holographic grating, is a film structure, and at least partially covers an outer side of the first surface.

In a second aspect, the present disclosure provides a head mounted display, which includes:

- the optical waveguide structure described above: and
- an optical machine configured for injecting light or an image into the optical waveguide structure.

In the technical solution provided in the embodiment of the present disclosure, a volume holographic element and a liquid crystal element are respectively provided on two surfaces of the optical waveguide body. The volume holographic element and the liquid crystal element can form an optical module and cooperate to couple light out through the liquid crystal element. Here, the liquid crystal element selectively diffracts and transmits the light propagating in the optical waveguide body. By cooperating with each other, they can freely modulate the light propagating in the optical waveguide body, which is conducive to increasing the imaging range of the image, thereby increasing the field of view of the optical waveguide. This allows the field of view of the image entering the human eye to be reasonably amplified, thereby meeting the requirement for a large field of view.

The solutions provided by the embodiments of the present disclosure may achieve a large field of view and blend with reality simultaneously.

Other features and advantages of the present disclosure will become apparent from the following detailed description of exemplary embodiments of the present disclosure with reference to the accompanying drawings.

BRIEF DESCRIPTION OF THE DRAWINGS

In order to clearly illustrate embodiments of the present disclosure or technical solutions in the prior art, accompanying drawings that need to be used in description of the embodiments or the prior art will be briefly introduced as follows. Obviously, drawings in following description are only the embodiments of the present disclosure. For those skilled in the art, other drawings can also be obtained according to the disclosed drawings without creative efforts.

DESCRIPTION OF REFERENCE SIGNS

Figure 1:
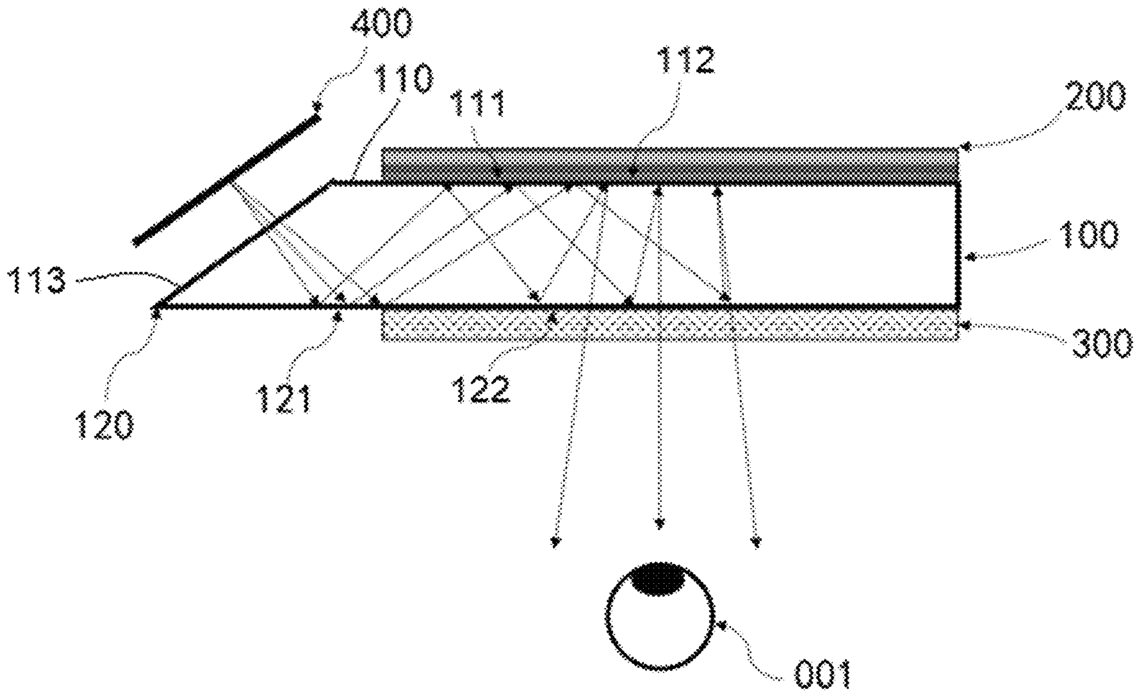
FIG. 1 is one of schematic structural diagrams of an optical waveguide structure provided by an embodiment of the present disclosure.

100, optical waveguide body: 110, first surface: 111, second total internal reflection zone: 112, second diffraction zone; 113, coupling-in zone; 120, second surface; 121, first total internal reflection zone: 122, first diffraction zone; 200, volume holographic element: 300, liquid crystal element: 310, alignment layer: 320, liquid crystal layer: 321, liquid crystal molecules: 400, optical machine: 001, human eye.

DETAILED DESCRIPTION

Various exemplary embodiments of the present disclosure will now be described in detail with reference to the accompanying drawings. It should be noted that the relative arrangement of parts and steps, numerical expressions, and values set forth in these embodiments do not limit the scope of the disclosure unless specifically stated otherwise.

The following description of at least one exemplary embodiment is in fact merely illustrative and is in no way intended as a limitation to the present disclosure and its application or use.

Technologies, methods and devices known to those of ordinary skill in the related field may not be discussed in detail; however, the technologies, methods and devices should be regarded as a part of the specification where appropriate.

In all examples shown and discussed herein, any specific value should be interpreted as merely exemplary rather than a limitation. Therefore, other examples of the exemplary embodiments may have different values.

It should be noted that similar reference numerals and letters represent similar items in the accompanying drawings below. Therefore, once an item is defined in one drawing, it is unnecessary to further discuss the item in the subsequent drawings.

The optical waveguide structure and the head mounted display provided by the embodiments of the present disclosure are described in detail below with reference to FIGS. 1 to 5.

According to an aspect of an embodiment of the present disclosure, an optical waveguide structure is provided, which may be suitably applied to a head mounted display (HMD).

Figure 4:
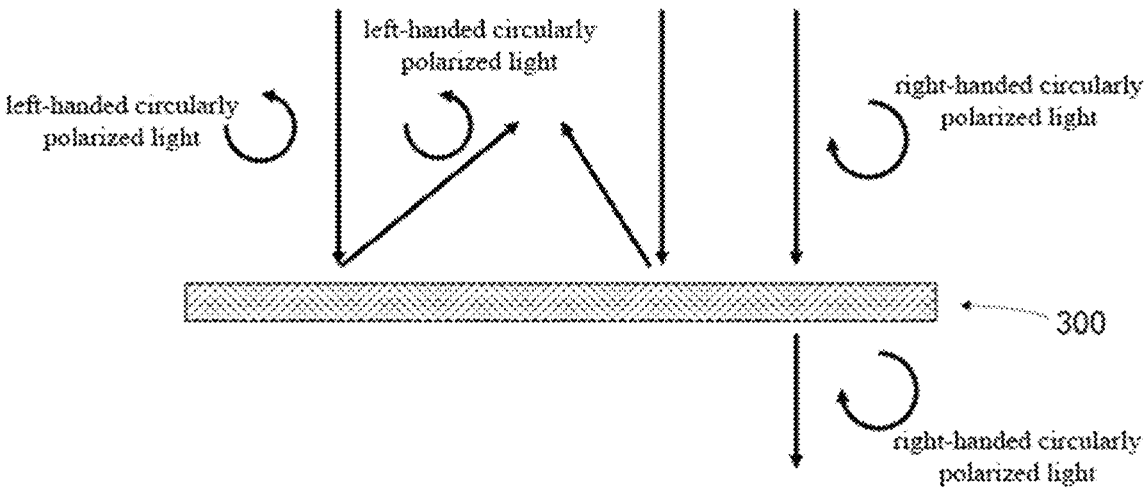
FIG. 4 is a first schematic principal diagram of an optical waveguide structure provided by an embodiment of the present disclosure.
Figure 5:
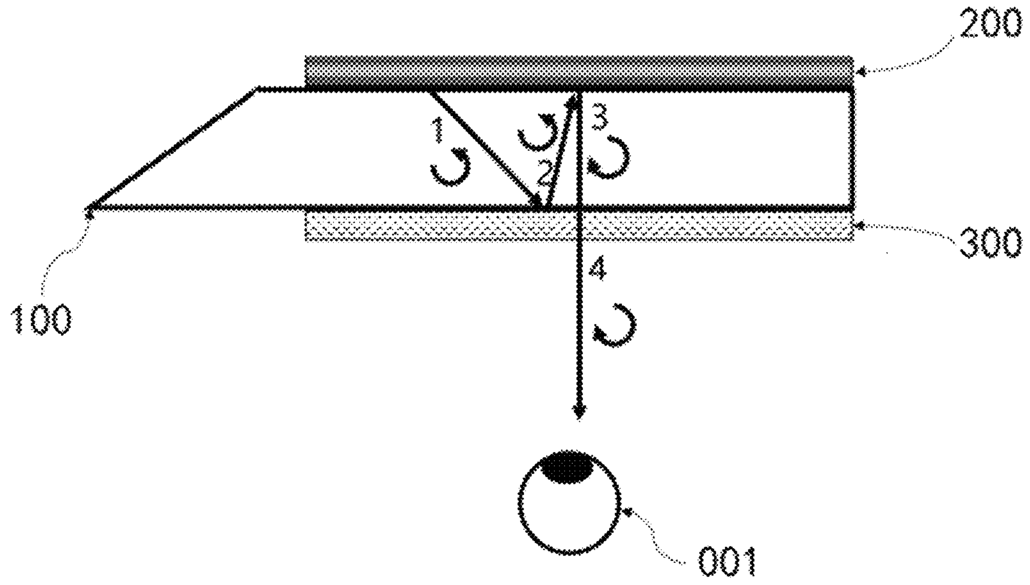
FIG. 5 is a second schematic principal diagram of the optical waveguide structure provided by an embodiment of the present disclosure.

Embodiments of the present disclosure provide an optical waveguide structure, as shown in FIGS. 1, 4 and 5. The optical waveguide structure includes an optical waveguide body 100, a volume holographic element 200, and a liquid crystal element 300;

wherein the optical waveguide body 100 includes a first surface 110 and a second surface 120 which are provided oppositely to each other, the volume holographic element 200 is provided on the first surface 110, and the liquid crystal element 300 is provided on the second surface 120;

the liquid crystal element 300 is configured for selectively diffracting and transmitting light, the light has a first circularly polarized light with a first polarization state which is diffracted towards the volume holographic element 200, the volume holographic element 200 is configured for rotating a polarization direction of the first circularly polarized light to form a second circularly polarized light with a second polarization state which is then diffracted towards the liquid crystal element 300. The second circularly polarized light is coupled out of the optical waveguide body 100 after being transmitted through the liquid crystal element 300.

In the optical waveguide structure provided by the embodiments of the present disclosure, the first surface 110 is further provided thereon with a coupling-in zone 113, which is configured to couple light into the optical waveguide body 100.

In the embodiment of the present disclosure, the first surface 110 and the second surface 120 of the optical waveguide body 100 are oppositely provided with a certain interval therebetween. Incident light can be coupled into the optical waveguide body 100 through the coupling-in zone 113 on the first surface 110 and propagate in the optical waveguide body 100. Furthermore, the volume holographic element 200 and the liquid crystal element 300 are respectively provided on the first surface 110 and the second surface 120. The volume holographic element 200 and the liquid crystal element 300 cooperate to form an integral coupling-out zone. which is configured for diffracting the light propagating in the optical waveguide body 100 and then coupling it out of the optical waveguide body 100, finally injecting the coupled-out light into the human eye 001 to display an image in the human eye 001.

In the optical waveguide structure provided by the embodiment of the present disclosure, after the light enters the optical waveguide body 100 through the coupling-in zone 113, the light first propagates forward by total reflection propagation. Upon encountering the volume holographic element 200, the propagation mode is not disturbed or affected because the angle of the light incident on the volume holographic element 200 is not within the response angle range of the volume holographic element 200. When the light encounters the liquid crystal element 300, if the angle of the light incident on the liquid crystal element 300 is within the response angle range of the liquid crystal element 300, the light can be diffracted toward the volume holographic element 200. In this process, the total internal reflection state of the light is changed, and the light at this point has been modulated by the liquid crystal element 300, imparting some optical power to the light, which helps to increase the field of view of the image in subsequent imaging. When the diffracted light encounters the volume holographic element 200, and the angle of the light incident on the volume holographic element 200 is just within the response angle range of the volume holographic element 200, it is diffracted a second time and propagates towards the human eye 001. At this point, the light has been modulated, and the modulated light can be imaged normally.

In the waveguide scheme provided by the embodiments of the present disclosure, the optical module, composed of the volume holographic element 200 and the liquid crystal element 300, may modulate light relatively freely before it is transmitted, allowing the field of view of the image to be designed and reasonably magnified to meet the requirements for a large field of view: In this way, it is possible to achieve a large field of view; and to blend with reality by combining with the optical waveguide, thereby enhancing the viewing experience of an user.

That is to say, in the optical waveguide structure provided in the embodiment of the present disclosure, the volume holographic element 200 and the liquid crystal element 300 are respectively provided on two surfaces of the optical waveguide body 100, and the volume holographic element 200 and the liquid crystal element 300 may form an optical module, wherein the liquid crystal element 300 may selectively diffract and transmit the light propagating in the optical waveguide body 100, and they cooperate to freely modulate the light propagating in the optical waveguide body 100, which is conducive to increasing the imaging range of the image and thus increasing the field of view of the optical waveguide, so that the field of view of the image entering the human eye may be reasonably amplified, thereby meeting the requirement for a large field of view: The optical waveguide structure may achieve a large field of view and blend with reality simultaneously.

In some examples of the present disclosure, the first surface 110 is provided with a second total internal reflection zone 111 and a second diffraction zone 112 arranged adjacently, both of which being covered by the volume holographic element 200; the second surface 120 is provided with a first total internal reflection zone 121 and a first diffraction zone 122 arranged adjacently, the first diffraction zone 122 being covered by the liquid crystal element 300.

As shown in FIG. 1, after the light enters the optical waveguide body 100 from the coupling-in zone 113 on the optical waveguide body 100, when the light encounters the first total internal reflection zone 121, total internal reflection may occur, and the light encounters the volume holographic element 200 after the total internal reflection. Since the angle at which the light at this time is incident on the volume holographic element 200 is not within the response angle range of the volume holographic element (i.e., the second diffraction zone 112 is not reached), the original mode of transmission of the light is not disturbed or influenced. When the light encounters the liquid crystal element 300, the angle at which the light is incident on the liquid crystal element 300 is within the response angle range of the liquid crystal element 300 (i.e., it falls into the first diffraction zone 122), and thus the light is diffracted in the first diffraction zone 122 towards the volume holographic element 200, and the total internal reflection state of the light is changed. At this time, the light has been modulated by the liquid crystal element 300, and has a certain optical power. The diffracted light encounters the volume holographic element 200 in the second diffraction zone 220, and at this time, the angle at which the light is incident on the volume holographic element 200 is within the response angle range of the volume holographic element 200, so that the light is transmitted towards the human eye 001 after being diffracted for the second time, and the light at this time has been modulated and may be imaged normally.

Since the optical coupling-out structure composed of the volume holographic element 200 and the liquid crystal element 300 may freely modulate the light, the field of view of the image may be designed and enlarged to meet the requirement for a large field of view; which is usually greater than 80°.

In some examples of the present disclosure, the light is reflected only once in the first diffraction zone 122.

In the optical waveguide structure provided by the embodiment of the present disclosure, wherein, the light coupled out of the optical waveguide body 100 after being transmitted through the liquid crystal element 300 is the second circularly polarized light with the second polarization state formed when the light is reflected once at the first diffraction zone 122 to the volume holographic element 200. At this time, the first circularly polarized light with the first polarization state propagates in the optical waveguide body 100 and is then reflected, and when encountering the volume holographic element 200, the polarization state thereof is changed to form the second circularly polarized light that may be transmitted through the liquid crystal element 300, which light is stray light and will influence the light incident to the human eye 001. Therefore, a black light-absorbing film layer may be provided in the optical waveguide body 100 to absorb the stray light.

In some examples of the present disclosure, the light coupled out of the liquid crystal element 300 forms an image with a field of view greater than 80°.

Through cooperation of the volume holographic element 200 and the liquid crystal element 300, the optical waveguide structure provided by the embodiments of the present disclosure can reasonably modulate the light propagating in the optical waveguide body 100, changing the way light propagates forward by total internal reflection. The modulated light may have a certain optical power and be coupled out of the optical waveguide body 100. In this way, This results in a relatively large field of view for the image formed in the human eye 001, which can exceed 80°, thereby improving the user's visual experience.

Figure 3:
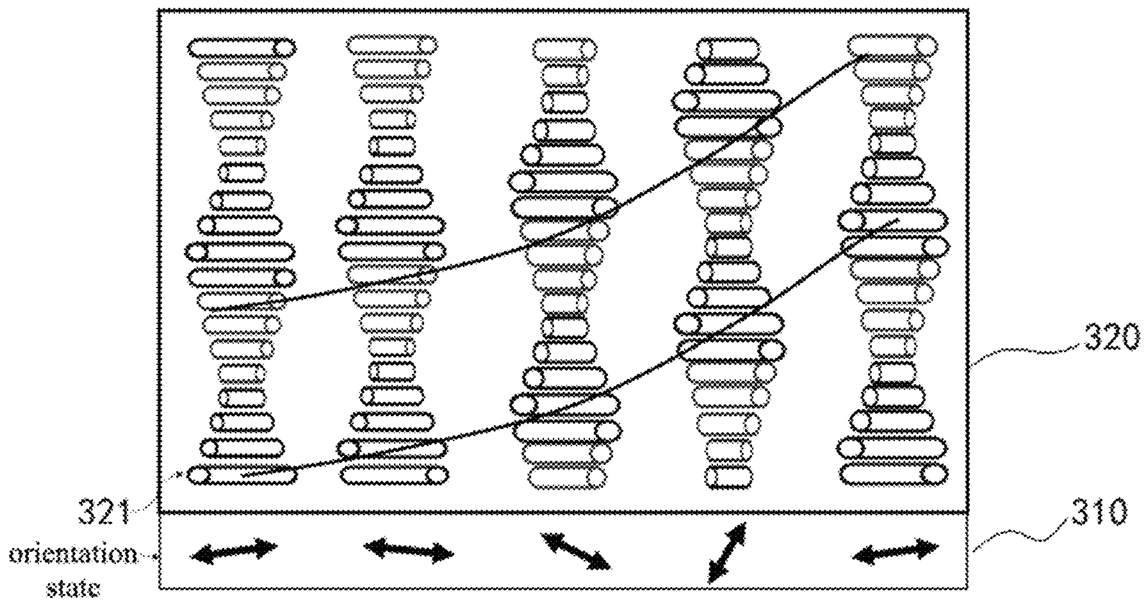
FIG. 3 is one of schematic structural diagrams of a liquid crystal element provided by an embodiment of the present disclosure.

In some examples of the present disclosure, as shown in FIGS. 3 to 5, the liquid crystal element 300 includes an alignment layer 310 and a liquid crystal layer 320 stacked together: wherein the alignment layer 310 provides orientation states with different directions, and is configured for aligning liquid crystal molecules 321 in the liquid crystal layer 320 according to a preset orientation state arrangement: liquid crystal molecules 321 in the liquid crystal layer 320 that are in contact with the alignment layer 310 are arranged according to the preset orientation state arrangement, and liquid crystal molecules 321 of an upper layer are sequentially rotated to form a left-or right-handed helical structure.

Figure 2:
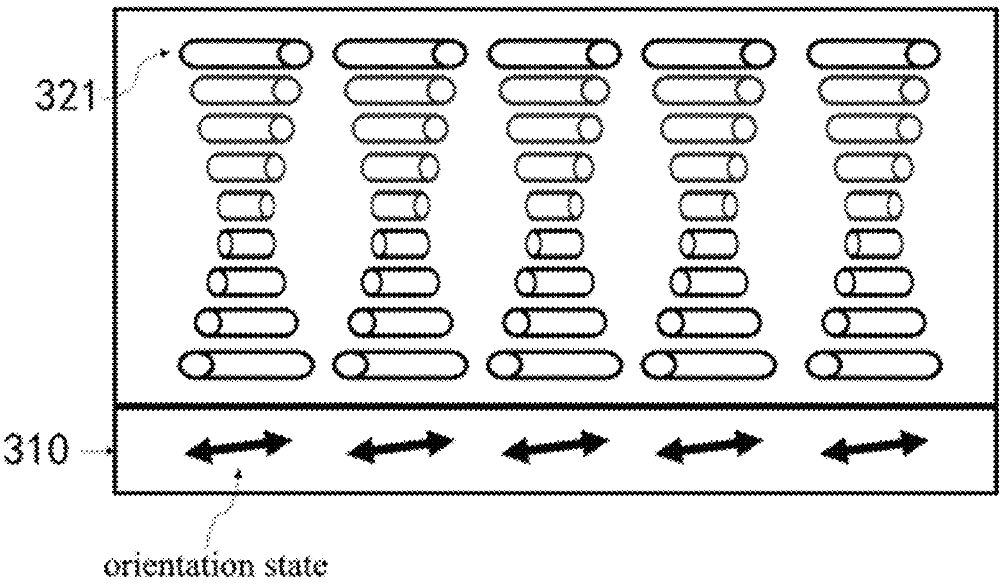
FIG. 2 is one of schematic structural diagrams of an existing liquid crystal element.

As shown in FIG. 2, the composition structure of the existing liquid crystal element is shown. The liquid crystal element shown in FIG. 2 mainly includes a lower alignment layer and a liquid crystal layer stacked on the alignment layer, wherein the alignment layer provides an orientation state. A uniform orientation is shown in FIG. 2. In fact, the orientation state can also vary with the spatial position, and the orientation of each position may be changed according to the design requirements. The liquid crystal molecules in the liquid crystal layer are in contact with the alignment layer, and the liquid crystal molecules contacting the alignment layer are correspondingly arranged according to the orientation state. The liquid crystal molecules in the upper layer are sequentially twisted, and each 180° of twisting distance constitutes a period.

As shown in FIG. 3, it shows the structure of the liquid crystal element 300 in the embodiment of the present disclosure, which is different from the liquid crystal element shown in FIG. 2 in that the orientation states in the alignment layer 310 are not uniform but are arranged in a pattern formed according to the design. The pattern may be a lens pattern, a grating pattern, or the like. Furthermore, the arrangement of the liquid crystal molecules in the liquid crystal layer 320 changes correspondingly according to the change of the pattern.

The connection line formed by the rotation states of the liquid crystal molecules 321 may be a straight line, a quadratic curve, or the like, which are not specifically limited in the embodiments of the present disclosure.

In the embodiment of the present disclosure, the arrangement of the liquid crystal molecules in the liquid crystal element is modified by design to deflect the incident light to an appropriate angle. Additionally, due to the high transmittance of the liquid crystal element, the light passing through it experiences almost no absorption loss, thereby improving the imaging effect and meeting the requirement for a large field of view.

In some examples of the present disclosure, as shown in FIG. 4, the liquid crystal element 300 exhibits polarization state selectivity for light propagating within the optical waveguide body 100.

The liquid crystal element 300 provided by the embodiment of the present disclosure responds to only circularly polarized light with one polarization state, i.e., it diffracts circularly polarized light with one polarization state.

For example, the liquid crystal element 300 provided by the embodiment of the present disclosure can diffract a first circularly polarized light with a first polarization state, and can transmit a second circularly polarized light with a second polarization state. At the same time, the diffracted light will continue to maintain its original polarization state.

In some examples of the present disclosure, the first circularly polarized light is left-handed circularly polarized light, and the second circularly polarized light is right-handed circularly polarized light: or, the first circularly polarized light is right-handed circularly polarized light, and the second circularly polarized light is left-handed circularly polarized light.

For example, the liquid crystal element 300 shown in FIG. 4 may only diffract the left-handed circularly polarized light while transmitting the right-handed circularly polarized light, wherein the polarization state of the diffracted light remains unchanged. That is, when the left-handed circularly polarized light is incident, the diffracted light is also the left-handed circularly polarized light.

Of course, the liquid crystal element 300 may also diffract only the right-handed circularly polarized light and transmit the left-handed polarized light. That is, when the right-handed circularly polarized light is incident, the diffracted light is also right-handed circularly polarized light.

In some examples of the present disclosure, the liquid crystal element 300 is a reflective liquid crystal grating, is a film structure, and at least partially covers an outer side of the second surface 120.

The liquid crystal element 300 provided by the embodiment of the present disclosure, for example, is a film-like structure and may be directly mounted on the second surface 120 of the optical waveguide body 100.

The liquid crystal element 300 may partially or completely cover the second surface 120, which may be flexibly chosen by those skilled in the art according to their needs, and is not limited in the embodiment of the present disclosure.

The above liquid crystal element 300 is, for example, a reflective diffraction grating.

In some examples of the present disclosure, the volume holographic element 200 is a reflective volume holographic grating, is a film structure, and at least partially covers the outer side of the first surface 110.

The volume holographic element 200 is one of the diffraction gratings.

In the embodiment of the present disclosure, the volume holographic element 200 may change the polarization state of the incident light. For example, when the incident light is the left-handed circularly polarized light, the left-handed circularly polarized light may be converted into the right-handed polarized light and then emitted.

The reflective volume holographic grating typically has higher diffraction efficiency and larger angular bandwidth, which contributes to increasing the imaging range of the image, allowing the field of view of the image entering the human eye to be reasonably enlarged to meet the requirements for a large field of view:

The volume holographic element 200 is a film-like structure and may be directly attached to the outer side of first surface 110.

In the embodiment of the present disclosure, both the volume holographic element 200 and the liquid crystal element 300 are film structures, and can be directly mounted on two surfaces of the optical waveguide body 100. This contributes to reducing the volume of the optical waveguide structure, making it thinner and lighter.

In some examples of the present disclosure, as shown in FIG. 1, the coupling-in zone 113 is an inclined structure on the first surface. Alternatively, the coupling-in zone 113 is a planar structure, and the optical waveguide structure further includes a coupling-in prism provided in the coupling-in zone 113.

Those skilled in the art may flexibly adjust the form of the coupling-in zone 113 according to the incident light, and this is not limited in the embodiment of the present disclosure.

As shown in FIG. 5, in the optical waveguide structure provided by the embodiment of the present disclosure, through the cooperation of the volume holographic element 200 and the liquid crystal element 300, when the light 1 propagating in the optical waveguide body 100 propagates to the liquid crystal element 300 and reaches the response position (the first diffraction zone 122), the left-handed circularly polarized light thereof will be diffracted and reflected only once towards the volume holographic element 200. Meanwhile, the light 2 will remain in the left-handed circularly polarized state. When the light 2 is diffracted by the liquid crystal element 300 and meets the response condition of the volume holographic element 200, it will be diffracted by the volume holographic element 200 towards the liquid crystal element 300. In this process, the light 3 is formed, and its polarization state changes into the right-handed circularly polarized state. Since the liquid crystal element 300 is designed not to respond to the right-handed circularly polarized light, the right-handed circularly polarized light will directly transmit through the liquid crystal element 300. The transmitted light 4 can reach the human eye 001 for normal imaging, while other reflected light is absorbed by the black light-absorbing film layer in the optical waveguide body 100.

According to another aspect of the embodiments of the present disclosure, a head-mounted display device is provided, which includes any of the above-described optical waveguide structures and an optical machine 400. The optical machine 400 is configured for injecting light or an image into the optical waveguide structure.

Specifically, as shown in FIG. 1, the optical machine 400 corresponds to the coupling-in zone 113 of the optical waveguide structure, and is configured for injecting light or an image into the coupling-in zone 113.

The head-mounted display device is, for example, an MR head-mounted device such as MR glasses or an MR helmet, which is not specifically limited in the embodiments of the present disclosure.

The head-mounted display device provided by the embodiment of the present disclosure uses the above optical waveguide structure, which is beneficial for increasing the imaging range of the image and, consequently, for increasing the field of view. Additionally, due to the small size of the optical waveguide structure, it helps reduce the size of the head-mounted display device, thus achieving miniaturization.

The specific implementation of the head-mounted display device in the embodiments of the present disclosure may refer to various implementations of the display module mentioned above, and will not be elaborated further here.

The above embodiments focus on the differences between the various embodiments. The different optimization features between the various embodiments, as long as they do not contradict each other, may be combined to form a better embodiment, which will not be repeated herein considering the brevity of the text.

Although some specific embodiments of the present disclosure have been described in detail through examples, those skilled in the art should understand that the above examples are for illustration only and are not intended to limit the scope of the present disclosure. Those skilled in the art should also understand that the above embodiments can be modified without departing from the scope and spirit of the present disclosure. The scope of the present disclosure is defined by the accompanying claims.

The invention claimed is:

1. An optical waveguide structure, comprising an optical waveguide body, a volume holographic element, and a liquid crystal element;

wherein, the optical waveguide body comprises a first surface and an oppositely positioned second surface, the volume holographic element is provided on the first surface, and the liquid crystal element is provided on the second surface;

wherein the liquid crystal element is configured for selectively diffracting and transmitting light that comprises a first circularly polarized light with a first polarization state diffracted towards the volume holographic element, the volume holographic element is configured for rotating a polarization direction of the first circularly polarized light to form a second circularly polarized light with a second polarization state diffracted towards the liquid crystal element, such that the second circularly polarized light is coupled out of the optical waveguide body after transmitting through the liquid crystal element.

2. The optical waveguide structure according to claim 1, wherein the first surface is provided with a second total internal reflection zone and a second diffraction zone arranged adjacently, both being covered by the volume holographic element; and the second surface is provided with a first total internal reflection zone and a first diffraction zone arranged adjacently, the first diffraction zone being covered by the liquid crystal element.

3. The optical waveguide structure according to claim 2, wherein the light is reflected only once in the first diffraction zone.

4. The optical waveguide structure according to claim 1, wherein the light coupled out of the liquid crystal element forms an image with a field of view greater than 80°.

5. The optical waveguide structure according to claim 1, wherein the liquid crystal element comprises an alignment layer and a liquid crystal layer stacked together;

wherein the alignment layer provides orientation states with different directions, and is configured for aligning liquid crystal molecules in the liquid crystal layer according to a preset orientation state arrangement; and liquid crystal molecules in contact with the alignment layer in the liquid crystal layer are arranged according to the preset orientation state arrangement, and liquid crystal molecules of an upper layer are sequentially rotated to form a left-or right-handed helical structure.

6. The optical waveguide structure according to claim 1, wherein the liquid crystal element exhibits a polarization state selectivity for light propagating within the optical waveguide body.

7. The optical waveguide structure according to claim 1, wherein the first circularly polarized light is left-handed circularly polarized light, and the second circularly polarized light is right-handed circularly polarized light; or the first circularly polarized light is right-handed circularly polarized light, and the second circularly polarized light is left-handed circularly polarized light.

8. The optical waveguide structure according to claim 1, wherein the liquid crystal element is a reflective liquid crystal grating with a film structure, and at least partially covers an outer side of the second surface.

9. The optical waveguide structure according to claim 1, wherein the volume holographic element is a reflective volume holographic grating with a film structure, and at least partially covers an outer side of the first surface.

10. A head mounted display, comprising:

an optical waveguide structure according to claim 1; and an optical machine configured for injecting light or an image into the optical waveguide structure.

* * * * *